Dec. 28, 1943.   P. S. PETERS   2,338,009
CUSHION-BONDING STRIP UNIT
Filed Oct. 30, 1942   2 Sheets-Sheet 1
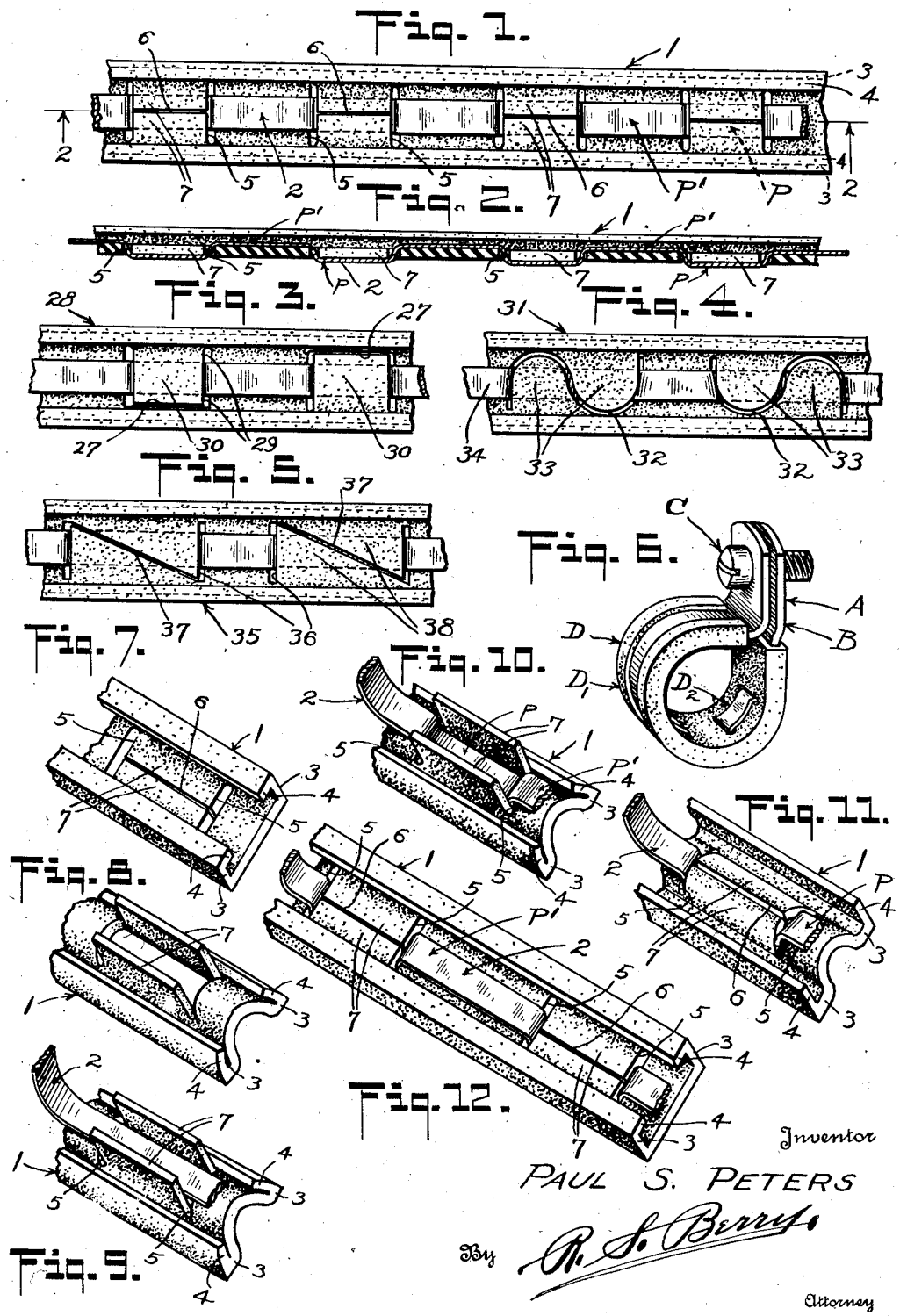
Inventor
PAUL S. PETERS Dec. 28, 1943.   P. S. PETERS   2,338,009
CUSHION-BONDING STRIP UNIT
Filed Oct. 30, 1942   2 Sheets-Sheet 2
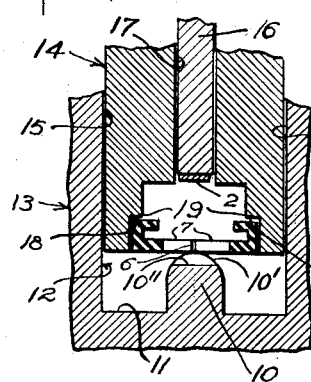
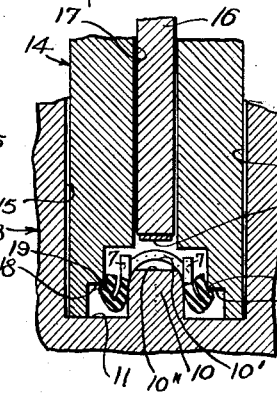
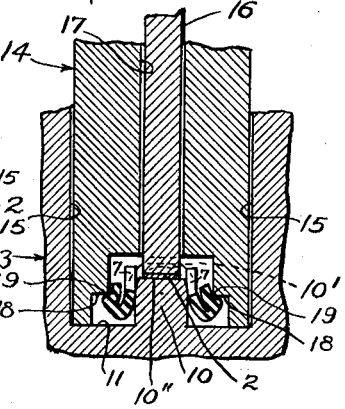
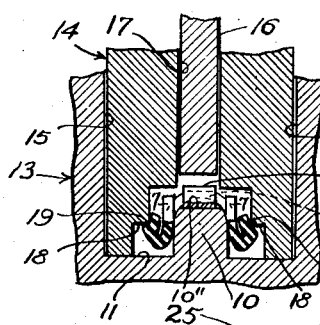
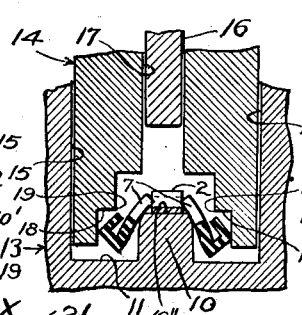
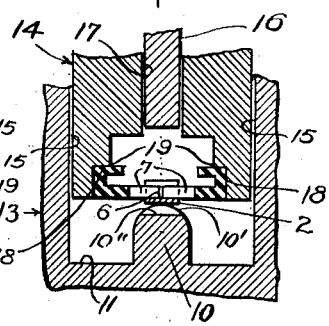
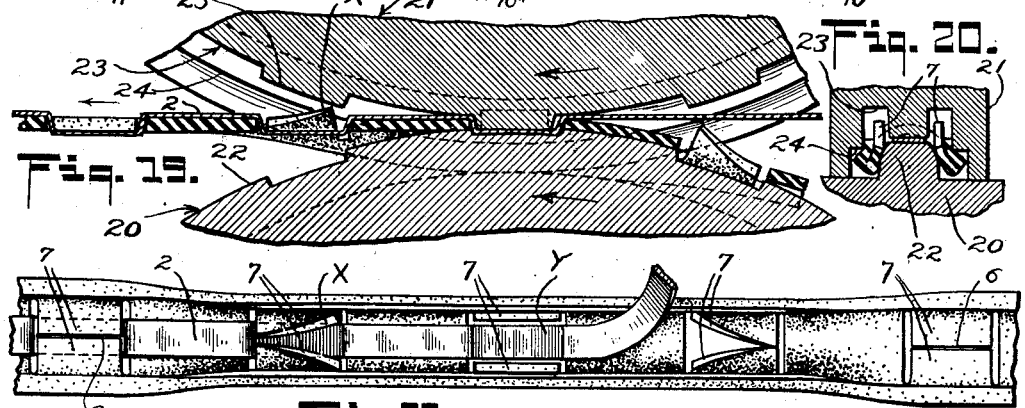
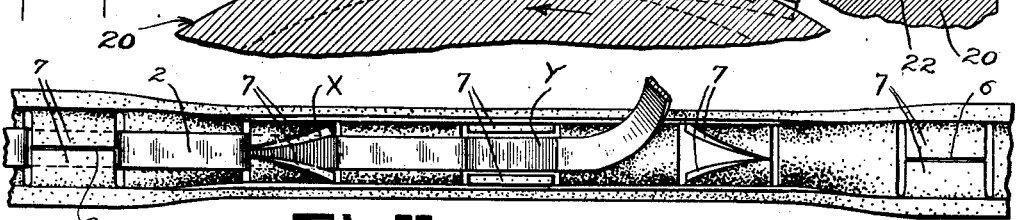
Inventor
PAUL S. PETERS
By
Attorney Patented Dec. 28, 1943

2,338,009

UNITED STATES PATENT OFFICE 2,338,009

CUSHION-BONDING STRIP UNIT

Paul S. Peters, Los Angeles, Calif., assignor to Adel Precision Products Corp., a corporation of California Application October 30, 1942, Serial No. 464,150

11 Claims. (Cl. 174—40)

This invention relates to devices for supporting aircraft conduit lines on cushion seats and in electrically bonded relation to the metal frame structure of the aircraft.

More particularly this invention relates to improvements in pre-assembled cushion-bonding strip units for conduit supports, wherein the bonding strip is reeved or threaded through transverse slots in a length of cushioning material to disposed portions of the bonding strip on opposite sides of the cushion. Due to the construction of the cushion as heretofore used this threading operation is ill-suited to machine performance and therefore has been carried out by hand Such a hand operation with cushions as heretofore constructed has proved tedious, slow, costly and conducive to an objectionable lack of uniformity in the finished units as well as to a frequent weakening or damaging of the bonding strip by reason of too much strain or tension being placed thereon or a critical bending thereof being effected during the threading operation. Excessive tension or critical bends may cause a rupture or break when the unit is clamped tightly on a conduit line.

One of the objects of this invention is to provide a cushion-bonding strip unit in which the cushion is especially constructed to make possible a much more simple and quickly effected assembling of the unit at a lower cost than heretofore and without the aforesaid difficulties and objections.

Another object is to provide a unit such as described which may be advantageously machine-assembled with a saving in costs, time and labor and an increased production compared to assembling methods heretofore used, and wherein the bonding strip is uniformly threaded through and disposed on the cushion without being objectionably tensioned or bent in the manner hereinbefore pointed out.

Another object is to provide a cushion-bonding strip unit such as described in which the construction of the cushion enhances the cushioning action thereof and increases the flexibility of the unit to render easier the application thereof to a conduit supporting device.

A further object is to provide a unit of the character described which readily lends itself to machine or other fabrication in long ribbon-like strips from which suitable lengths may be cut and as constituted are readily applicable to conduit clips, blocks or similar devices to form therein cushioning and "bonded" seats for conduit lines or the like.

Another object of my invention is to provide a unit of the character described wherein the bonding strip is incorporated with the cushion in threaded relation thereto without necessitating an actual threading thereof through the cushion; the cushion being formed with transverse conduit-receiving openings or slots between pairs of which self-closing openings such as slits extend generally longitudinally of the cushion to afford the pushing of portions of the bonding strip through the self-closing openings and thus into said transverse opening whereby portions of the strip will lie upon opposite sides of the cushion when the self-closing openings are closed, in the same manner as though threaded through the transverse openings.

A further object of this invention is to provide a new and efficacious method of forming cushion-bonding strip units with a saving in time, labor and costs and at an increased production compared with methods heretofore employed.

With the foregoing objects in view, together with such other objects and advantages as may subsequently appear, the invention resides in the parts and in the combination, construction and arrangement of parts hereinafter described, and claimed, and illustrated by way of example in the accompanying drawings, in which:

Fig. 1 is a fragmentary plan view of a cushion-bonding strip unit embodying my invention;

Fig. 2 is a longitudinal sectional view taken on the line 2—2 of Fig. 1;

Fig. 3 is a fragmentary plan view of a variational form of my invention;

Fig. 4 is a fragmentary plan view of another variational form of the invention;

Fig. 5 is a fragmentary plan view of a further modified form of the invention;

Fig. 6 is a perspective view of a conduit clip equipped with a cushion-bonding strip unit embodying my invention;

Fig. 7 is a fragmentary perspective view of a cushion embodying my invention, as before it is distorted and opened to receive the bonding strip;

Fig. 8 is a fragmentary perspective view showing how the cushion is distorted and opened preparatory to applying the bonding strip;

Fig. 9 is a fragmentary perspective view of the cushion and strip showing the bonding strip in position to be forced through an opened portion of the cushion;

Fig. 10 is a fragmentary view of the cushion and strip as they would appear when the strip is forced through the cushion and before an opened portion of the cushion is closed over the forced-through part of the strip;

Fig. 11 is similar to Fig. 10 with a portion of the cushion partly closed over the portion of the strip which is forced through the cushion;

Fig. 12 is a fragmentary perspective view of a length of the finished cushion-bonding strip unit which has been produced by following the steps down in Figs. 7 to 11 inclusive;

Figs. 13 to 18 inclusive are fragmentary and partly schematic vertical sectional views showing one form of apparatus which may be employed to carry out the method hereof, said views showing in their order the successive method steps and the successive operations of said apparatus necessary to effect a machine fabrication of the unit of my invention;

Figs. 19 and 20 are fragmentary sectional views taken at right angles to one another and showing another form of apparatus by which the method hereof may be carried out;

Fig. 21 is a fragmentary plan view of a unit of my invention as it would appear while being formed with the apparatus shown in Figs. 19 and 20.

Referring to the drawings more specifically, Figs. 1 and 2 show a cushion-bonding strip unit embodying my invention and which generally comprises an elongated cushion 1 of compressible elastic material such as rubber, synthetic rubber or the like, and a flexible and relatively inert and narrow metallic bonding strip or ribbon 2 which is extended through the cushion at spaced intervals to dispose portions P and P' thereof on opposite surfaces of the cushion.

A suitable length of such a unit, in one use thereof, is employed as shown in Fig. 6 in a clip A for supporting a metal conduit in an aircraft, the clip including a metal conduit embracing strap B adapted to be secured to a metallic structural part of the aircraft (not shown) by means of a fastening C. In Fig. 6, D represents the cushion-bonding strip unit as applied to the strap, so that the cushion D1 forms a vibration absorbing seat for the conduit, while the bonding strip D2 bonds or "grounds" the conduit to the metal strap B which is in turn grounded to the aforesaid aircraft structure (not shown).

The cushion member 1 here shown is provided with marginal flanges 3 to engage the longitudinal edges of the strap B or like member on which it is mounted, and the flanges 3 are provided with right angularly extending flanges 4 which are adapted to lie on one face of the strap while the cushion proper lies on the opposite face of said strap, thereby securely holding the cushion on the strap.

In accordance with my invention the cushion 1, that is, a suitable length of such cushioning material, and a similar length of the bonding strip 2, are combined to form a cushion-bonding strip unit from which are cut portions of suitable length as, for example, for clips as shown in Fig. 6 or for any use to which such lengths of the unit may be put.

In order to do away with the tedious, slow and comparatively costly hand threading of the bonding strip through the cushion as heretofore practiced, I provide between pairs of the usual transverse bonding strip-receiving slots 5 in the cushion, at longitudinally spaced points thereon, narrow "self-closing" openings or slits 6 which define opposed flap portions 7 normally lying in the plane of the cushion proper. These slits make it possible to easily distort the cushion and force the flap portions 7 apart as shown in Figs. 8 and 9 so that portions P of the bonding strip 2 placed on one side of the cushion may be pushed or forced between said opened flaps through the cushion and into said slots as shown in Fig. 10, and upon removal of the distorting and flap-opening force, said flaps will spring back (see Fig. 1) into closed level position affording a smooth flat seat on which the strip portions P will lie on one side of the cushion over the slits 6, while the other portions P' of the strip will be disposed on the other side of the cushion between the slit-connected pairs of the slots 5 shown in Figs. 1, 2 and 12.

It is now seen that the elongated cushion has cuts or openings at longitudinally spaced points therein and that each of such cuts has a longitudinal extent but slightly greater than that of each of the portions P of the bonding strip, and a transverse extent but slightly greater than the width of the bonding strip whereby the strip may be forced in place in accordance with this invention without being threaded or reeved through the cushion in the manner heretofore practiced.

Apparatus with which the method hereof may be carried out is shown in Figs. 13 to 18 inclusive. Fig. 1 shows the first step of placing the cushion strip in the apparatus. This apparatus includes an upstanding and elongated rib-like die 10 on the bottom wall 11 of a groove or depression 12 in a body member 13, a plunger die 14 slidable into and out of the depression 12 in contact with side walls 15 and adapted to force the cushion against the die 10 to open the slits 6 and spread the flaps 7 apart, and a forcing die 16 slidably supported in a slot 17 in the die 14 and movable to force the bonding strip through the cushion between the flaps 7.

The die 14 has an elongated cushion receiving groove or socket 18 in its lower face provided with shoulders 19 for contacting the flanges 4 of the cushion while the other face of the cushion lies longitudinally centered on the die 10. Die 10 is designed to force one of the slits 6 open at a time and has a rounded upper edge 10' except where the slit 6 extends over the die at which latter point it is formed with a depression 10" having a flat upper surface.

With the cushion seated between dies 10 and 14 as shown in Fig. 13, the first operation of opening the slit 6 over the die 10 takes place as shown in Fig. 14, when the dies 10 and 14 are brought together. The shoulders 19 force the longitudinal edge portions of the cushion downwardly against the sides of die 10 and thereby stretch and distort the cushion so as to open the slit 6 and spread apart the flaps 7 which are then held apart by die 10.

The next step of forcing the portion P of the bonding strip through the cushion is illustrated in Fig. 15 and takes place when the plunger 16 is depressed while dies 10 and 14 remain in position shown in Fig. 14. The bonding strip 2 which has been previously inserted in the slot 17 beneath the plunger 16 is forced downwardly between the opened flaps 7 as shown in Figs. 7 and 15 and into the depression 10". As the strip 2 is comparatively inert the portion P will remain in the depression 10" in a plane below the lower side of the cushion when the latter is allowed to resume its flat position shown in Fig. 13. Thus after the die 16 is operated to protrude portion P through the cushion and into the slots 5 as shown in Figs. 7 and 15, said die is lifted as shown in Fig. 16 so that the die 14 may now be lifted as shown in Fig. 17 to release the stretching force on the cushion and allow the flaps 7 to spring back over the portion P.

Fig. 18 shows the final step of further lifting the die 14 to clear the cushion and portion P from the depression 10'' whereby the cushion may be advanced as in a punch press to force another portion P through the cushion and these operations are repeated for each slit 6 and its associated pair of slots 5 until the lengths of strip and cushion have been threaded together to produce a unit as shown in Figs. 1 and 2.

Figs. 19 and 20 show another form of apparatus which may be used to fabricate the improved cushion-bonding strip unit hereof. This apparatus includes coacting circular and rotary die members 20 and 21. Member 20 is provided on its periphery with a plurality of outwardly projecting dies 22 corresponding to the dies 10 as to shape and purpose and spaced apart in accordance with the spacing of the slits 6 and their associated slots 5.

The other die member 21 is provided on its periphery with a circumferential groove 23 into which the periphery of the member 20 extends. The groove 23 is adapted to receive a cushion strip 1 and a bonding strip 2 in the same manner as in the die 14, there being in said groove circumferential shoulders 24 for engaging the edge portions of the cushion to stretch the cushion over the dies 22 as shown in Fig. 20, also a plurality of dies 25 spaced inwardly of the shoulders and adapted to register with the dies 22 as the two die members are rotated. The bonding strip 2 is inserted between the two rotary die members as shown in Fig. 19 so as to lie between the cushion and the dies 25 which latter act in the same manner as the die 16 to insert the strip through the cushion. The arrows in Fig. 19 show the direction of rotation of the die members and the direction of the feed of the cushion and bonding strips. The radius of these die members and the length of the cooperating dies 22 and 25 are such that as the two members are rotated said cooperating dies will successively force portions P through the cushion in the manner shown in Fig. 20.

As the members 20 and 21 are rotated after a pair of the dies thereon have come together as shown in Fig. 20, these dies are moved apart thereby freeing the cushion and allowing flaps 7 to close as shown at X in Figs. 19 and 21. Fig. 21 shows the unit under construction as in Fig. 19, as removed from the die members, it being noted that while the flaps 7 of one set are being allowed to close as at X by the separation of the die members, the flaps of the next set as at Y are held open by the next set of die members which latter are then in position shown in Fig. 20.

A modified form of the unit as shown in Fig. 3 includes self-closing slits 27 formed in the cushion 28 between the transverse slots 39 at certain corresponding ends of said slots thereby defining but one flap portion 30 which may be opened in the same manner as the flaps 7 to facilitate the placement of the bonding strip. This arrangement provides a series of U-shaped openings in the cushion instead of the H-shaped openings formed by the slot 5 and slits 6.

Fig. 4 shows another modified form of the unit wherein the cushion 31 is formed with a series of S-shaped slots 32 serving the same purpose as the transverse slots 5 and the slits 6 and defining two flaps 33. It is readily seen that these S-shaped slots will permit of the use of the same method and apparatus to incorporate the bonding strip 34 in threaded relation to the cushion.

Fig. 5 shows another modified form wherein the cushion 35 is formed with transverse slots 36 and diagonal slits 37, producing two flaps 38. It is apparent that this form of cushion permits of the same method of placing the bonding strip as the other forms of the invention.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a cushion-bonding strip unit for conduit supports, a length of cushioning material having slots at longitudinally spaced points therein and self-closing slits extending between and into certain of said slots whereby a bonding strip extended over said slots and slits may be pushed through said slitted portions into said slots, and a flexible metallic bonding strip extended as aforesaid through said slots with portions disposed on opposite surfaces of the cushioning material.

2. In a cushion-bonding strip unit for conduit supports, a length of flexible cushioning material having transverse cuts therethrough and self-closing cuts extending therethrough between and into certain of the transverse cuts in an arrangement such that a flexible bonding strip extended over said cuts may be pushed through the self-closing cuts and thereby extended through the transverse cuts, and a flexible bonding strip extended as aforesaid through said transverse slits with portions disposed on opposite faces of the cushioning material, certain of said portions of the bonding strip underlying the self-closing cuts.

3. In a cushion bonding strip unit for conduit supports a length of flexible resilient cushioning material having transverse cuts therethrough at longitudinally spaced joints thereon and other longitudinally spaced self-closing cuts extending generally lengthwise thereof and between and intersecting certain of the transverse cuts in an arrangement such that a flexible bonding strip extended over said cuts may be forced at spaced points through the self-closing cuts and thereby threaded through said transverse cuts, and a flexible bonding strip which has been extended through said transverse cuts as aforesaid and which overlies the self-closing cuts on one surface of the cushioning material and also overlies those portions of the other surface of said length of cushioning material which are between said self-closing cuts.

4. In a cushion-bonding strip unit, a length of flexible cushioning material having a plurality of narrow bonding strip-receiving openings extending transversely thereof at longitudinally spaced points thereof, and means embodied in the length of cushioning material affording the pushing of longitudinal spaced portions of a bonding strip therethrough at points between as well as into said openings to dispose portions of the bonding strip on opposite surfaces of said lengths of cushioning material.

5. In a cushion-bonding strip unit, a length of flexible cushioning material having longitudinally spaced openings extending transversely thereof, and means embodied in the strip between pairs of said openings affording the pushing of spaced portions of a flexible bonding strip extended lengthwise along one surface of said length of material, through said material between said pairs of openings and into said openings to dispose portions of the bonding strip on opposite sides of the cushion strip, said means providing for the closing of the portions of the cushion strip between said pairs of openings after the strip has been pushed through the cushioning material as aforesaid.

6. In a cushion-bonding strip unit for conduit supports, an elongated cushion having a plurality of slots at longitudinally spaced points therein for reception of a bonding strip, and longitudinally slitted portions between pairs of said slots providing for the insertion of the bonding strip through the cushion and into said slots to dispose portions of the strip on opposite surfaces of the cushion.

7. In a cushion-bonding strip unit, an elongated cushion of elastic compressible material having a plurality of slots at longitudinally spaced points for reception of a bonding strip, and cuts made through the cushion between pairs of said slots to define resilient self-closing portions which upon stretching and distorting the cushion are spread apart to permit of the insertion of elongated portions of a bonding strip through the cushion and into said slots, to position it on opposite faces of the cushion upon the closing of said self-closing portions.

8. In a cushion-bonding strip unit, an elongated cushion of elastic material, a metallic bonding strip of less width than the cushion, having elongated portions extending along opposite faces of the cushion; and cuts through the cushion at longitudinally spaced points thereon, each of said cuts having a longitudinal extent somewhat greater than that of certain of said elongated portions of the strip and a transverse extent somewhat greater than the width of the strip.

9. In a cushion-bonding strip unit, an elongated cushion having transversely and longitudinally ranging cuts at longitudinally spaced points therein, and a flexible bonding strip of less width than the cushion and having portions overlying the cuts on one surface of the cushion and other portions extending between said cuts on the other surface of the cushion, each of said cuts having a transverse extent somewhat greater than the width of the cushion and a longitudinal extent somewhat greater than the length of the portions of the strip which overlie said cuts.

10. The method of forming a cushion-bonding strip unit which consists in forming longitudinally and transversely ranging self-closing cuts at longitudinally spaced points in a strip of elastic cushioning material, stretching and distorting said cushion strip to open said self-closing cuts, forcing through said cuts while thus held open, portions of a bonding strip, then releasing the cushion to allow the self-closing cuts to close so that said portions of the bonding strip will overlie the closed cuts on one side of the cushion and other portions of said bonding strip will overlie the cushion between said cuts on the other surface of the cushion.

11. The method of forming a cushion-bonding strip unit, which consists in providing longitudinally ranging openings in a strip of elastic cushioning material at longitudinally spaced points thereon, distorting said cushion strip to increase the size of said openings, forcing elongated portions of a bonding strip through said openings, then ceasing the distortion of said cushion strip and allowing the openings to return to normal size with portions of the bonding strip overlying said openings on one side of said cushion strip and other portions overlying the other side of said cushion at points between said openings.

PAUL S. PETERS.